(12) United States Patent
Lindner et al.

(10) Patent No.: US 9,725,326 B2
(45) Date of Patent: Aug. 8, 2017

(54) HYDROPHILIC SILICA AS FILLER FOR SILICONE RUBBER FORMULATIONS

(75) Inventors: Gottlieb-Georg Lindner, Bonn (DE); Michael Kempf, Rodenbach (DE)

(73) Assignee: Evonik Degussa GmbH, Essen (DE)

( * ) Notice: Subject to any disclaimer, the term of this patent is extended or adjusted under 35 U.S.C. 154(b) by 811 days.

(21) Appl. No.: 13/263,110

(22) PCT Filed: Jul. 3, 2009

(86) PCT No.: PCT/CN2009/000754
§ 371 (c)(1),
(2), (4) Date: Oct. 6, 2011

(87) PCT Pub. No.: WO2011/000133
PCT Pub. Date: Jan. 6, 2011

(65) Prior Publication Data
US 2012/0029136 A1   Feb. 2, 2012

(51) Int. Cl.
*C01B 33/193* (2006.01)
*C09C 1/30* (2006.01)
*C09D 183/04* (2006.01)

(52) U.S. Cl.
CPC .......... *C01B 33/193* (2013.01); *C09C 1/3081* (2013.01); *C09D 183/04* (2013.01); *C01P 2004/51* (2013.01); *C01P 2006/11* (2013.01); *C01P 2006/12* (2013.01); *C01P 2006/19* (2013.01); *C01P 2006/40* (2013.01); *Y10T 428/2982* (2015.01)

(58) Field of Classification Search
CPC .... C01B 33/193; C09C 1/3081; C09D 183/04
USPC ....................................................... 423/335
See application file for complete search history.

(56) References Cited

U.S. PATENT DOCUMENTS

| | | | |
|---|---|---|---|
| 4,003,981 A | 1/1977 | Turk et al. | |
| 4,273,589 A | 6/1981 | Nauroth et al. | |
| 4,857,289 A * | 8/1989 | Nauroth et al. | 423/339 |
| 5,871,867 A | 2/1999 | Rausch et al. | |
| 6,180,076 B1 | 1/2001 | Uhrlandt et al. | |
| 6,956,080 B2 | 10/2005 | Scholz et al. | |
| 7,070,749 B2 | 7/2006 | Lindner et al. | |
| 7,097,818 B2 | 8/2006 | Lindner et al. | |
| 7,144,930 B2 * | 12/2006 | Meyer et al. | 523/216 |
| 7,566,433 B2 | 7/2009 | Stenzel et al. | |
| 7,767,180 B2 | 8/2010 | Panz et al. | |
| 7,871,588 B2 | 1/2011 | Lindner et al. | |
| 2003/0003040 A1 | 1/2003 | Lindner et al. | |
| 2007/0059232 A1* | 3/2007 | Stenzel et al. | 423/335 |
| 2007/0299203 A1 | 12/2007 | Panz et al. | |

FOREIGN PATENT DOCUMENTS

| | | |
|---|---|---|
| CN | 1903720 A | 1/2007 |
| DE | 27 16 225 A1 | 10/1978 |
| RU | 2 295 948 | 3/2005 |
| RU | 2 310 602 | 11/2007 |
| RU | 2 358 908 | 12/2008 |
| TW | I233427 B | 6/2005 |
| TW | 200811037 A | 3/2008 |
| TW | 200817281 A | 4/2008 |

OTHER PUBLICATIONS

International Search Report issued Apr. 15, 2010 in PCT/CN09/000754 filed Jul. 3, 2009.
Extended European Search Report issued Apr. 18, 2013, in European Patent Application No. 09846662.6.
Russian Office Action w/Translation dated Jun. 25, 2013 issued in Patent Application No. 2012 103 381.

* cited by examiner

*Primary Examiner* — John Uselding
(74) *Attorney, Agent, or Firm* — Oblon, McClelland, Maier & Neustadt, L.L.P.

(57) ABSTRACT

Provided is a hydrophilic precipitated silica which is well suited to use in silicone rubber formulations (RTV-1, RTV-2, HTV and LSR), particularly well suited to use in HTV silicone rubber formulations. It has a BET surface area of 185~260 m$^2$/g, a CTAB surface area of 100~160 m$^2$/g, a BET/CTAB ratio of 1.2~2.6, and a conductivity of <250 μS/cm. Also provided are a process for producing the precipitated silica and the use of the precipitated silica for thickening and reinforcing silicone rubber formulations.

15 Claims, No Drawings

HYDROPHILIC SILICA AS FILLER FOR SILICONE RUBBER FORMULATIONS

CROSS REFERENCE TO RELATED APPLICATION(S)

This application is a 35 U.S.C. §371 national stage patent application of international patent application PCT/CN2009/000754, filed on Jul. 3, 2009, the text of which is incorporated by reference.

The present invention relates to hydrophilic precipitated silicas which are well suited for use in silicone rubber formulations (RTV-1, RTV-2, HTV and LSR), particularly well suited for use in HTV silicone rubber formulations, a process for the preparation thereof and the use thereof for thickening and reinforcing silicone rubber formulations.

Silicone rubbers are materials which can be converted into the elastomeric state and contain, as base polymers, polydiorganosiloxanes which have groups accessible to crosslinking reactions. Predominantly suitable as such are H-atoms, OH groups and vinyl groups which are present at the chain ends but may also be incorporated into the chain. Fillers, such as, for example, hydrophilic precipitated silicas, are incorporated as reinforcing agents into this system, the type and amount of which substantially influence the mechanical and chemical behaviour of the vulcanizates. Silicone rubbers can be coloured by inorganic pigments. A distinction is made between high temperature vulcanizing and room temperature vulcanizing silicone rubber types (HTV and RTV). In the case of the high temperature vulcanizing silicone rubber types, a distinction may furthermore be made between HTV silicone rubber and liquid silicone rubber (LSR).

In the case of the room temperature curing or RTV silicone rubber materials, a distinction may be made between one-component systems and two-component systems. The first group (RTV-1C) polymerizes slowly at room temperature under the influence of atmospheric humidity, the crosslinking taking place by condensation of SiOH groups with formation of Si—O bonds. The SiOH groups are formed by hydrolysis of SiX groups of a species formed as an intermediate from a polymer having terminal OH groups and a so-called crosslinking agent R—SiX$_3$ (e.g. X=—O—CO—CH$_3$, —NHR). In the case of two-component rubbers (RTV-2C), for example, mixtures of silicic acid esters (e.g. ethyl silicate) and organotin compounds are used as crosslinking agents, the formation of an Si—O—Si bridge from ≡Si—OR and ≡Si—OH (-=methyl group; R=organic radical) by alcohol elimination taking place as a crosslinking reaction.

Inter alia, silicas are used for thickening and reinforcing RTV-1C silicone rubber. Owing to the sensitivity of the silicone sealing compounds to hydrolysis, they must introduce as little moisture as possible into the system. To date, virtually exclusively fumed silicas have therefore been used for this application. However, EP 1860066 also discloses novel hydrophilic precipitated silicas having a special surface character, which are suitable for thickening RTV-1C formulations. Furthermore, U.S. Pat. No. 5,395,605, US 2008/0019898 and WO 2003/055801 describe various precipitated silicas for silicone rubber formulations which silicas are distinguished in each case by a low water absorption. Precipitated silicas having a low water absorption require very special and complicated preparation methods. Furthermore, preparation and transport require a considerable effort.

While, owing to the water crosslinking, RTV-1C silicone rubber formulations are very sensitive to any introduction of water and therefore set special requirements for the fillers with regard to the introduction of water, this problem does not occur to this extent in the case of HTV silicone rubber formulations. Here in particular good processability of the formulation after introduction of filler and a high mechanical load capacity of the silicone rubber product, in particular long-term load capacity, must be ensured. Furthermore, particularly in the case of transparent silicone rubber formulations, the fillers should lead to as little discolouration as possible and permit high transparency.

In the case of the RTV-2C silicone rubber and liquid silicone rubber formulations, too, the introduction of water into the system is not of great importance since the silicone rubber producers specially pretreat or aftertreat the filler, for example hydrophilic precipitated silicas. Thus, for example, the silicas are rendered water repellent during the compounding in situ so that the moisture introduced by the silica escapes or is reduced during this preparation process.

EP 1557446 describes HTV silicone rubber formulations which do not foam during the extrusion. Here too, a reduction of the water absorption of the precipitated silica is proposed as a solution.

There is therefore still a need for fillers for silicone rubber formulations, in particular HTV formulations, which can be used even in the case of a relatively high water content and exhibit good processing properties.

It was therefore an object of the present invention to provide novel precipitated silicas which do not have at least some of the disadvantages of the precipitated silicas of the prior art or do so only to a reduced extent. Furthermore, it is intended to provide a process for the preparation of the novel precipitated silicas.

A specific object of the present invention was to provide precipitated silicas which can be readily incorporated and dispersed in silicone rubber formulations, in particular HTV formulations, and impart good mechanical properties, in particular good long-term load capacity, to them. Moreover, it was a specific object of the present invention to provide precipitated silicas which permit the preparation of HTV formulations (compounds and vulcanizates) having very high transparencies, preferably in combination with very little discolouration.

Further objects not explicitly mentioned arise from the overall context of the following description, examples and claims.

The abovementioned objects are achieved by the precipitated silicas defined in more detail in the following description, the examples and the claims and by the process defined in more detail there.

The present invention therefore relates to hydrophilic precipitated silicas which are characterized in that they have
a BET surface area of 185 to 260 m$^2$/g
a CTAB surface area of 100 to 160 m$^2$/g
a BET/CTAB ratio of 1.2 to 2.6 m$^2$/g
a conductivity of <250 (µS)/cm.

The present invention furthermore relates to a process for the preparation of the precipitated silicas according to the invention, characterized in that it comprises the following steps:
a) preparation of an initially introduced mixture having a Y value of 10 to 30,
b) simultaneous metering of alkali metal silicate and/or alkaline earth metal silicate and acidifying agent into this initially introduced mixture with stirring at 80 to 95° C. for 60 to 90 min, c) reacidification of the precipitation suspension,
d) ageing of the suspension for 5 to 50 min,
e) filtration, washing and drying,
and which is characterized in that the alkali metal silicate and/or alkaline earth metal silicate used in steps a) and/or b) has an alkali metal oxide or alkaline earth metal oxide content in the range from 4 to 7% by weight and a silicon dioxide content in the range from 12 to 28% by weight, in that the acidifying agent used in step b) and/or c) is an acidifying agent selected from the group consisting of concentrated mineral acids and carbonic acid (or $CO_2$ gas) and sodium hydrogen sulphite (or $SO_2$ gas) in the correspondingly possible concentrations, and in that the Y value of the precipitation suspension is kept constant at a value between 10 and 30 during the precipitation, keeping constant meaning that the Y value varies by not more 3% about the starting Y value, i.e. the value directly before the beginning of the simultaneous addition of acidifying agent and alkali metal silicate or alkaline earth metal silicate, in the course of the simultaneous addition of acidifying agent and alkali metal silicate or alkaline earth metal silicate.

The present invention also relates to silicone rubber formulations, in particular HTV silicone rubber formulations, containing the precipitated silicas according to the invention, and to the use of the precipitated silicas according to the invention as a reinforcing filler for silicone rubber formulations.

The inventors have surprisingly found that the precipitated silicas according to the invention can be very readily incorporated into silicone rubber formulations, i.e. have short incorporation times. Thus, it is possible to achieve good dispersibility and high loads with the precipitated silicas according to the invention, i.e. to incorporate a large amount of reinforcing filler into the silicone rubber formulation.

Furthermore, the precipitated silicas according to the invention impart good mechanical properties to the silicone rubber formulations. Particularly in the case of a high load, the precipitated silicas according to the invention lead to a good long-term capacity of the silicone rubber formulations.

A further advantage of the precipitated silicas according to the invention is that silicone rubber compounds, i.e. as yet uncured mixtures and cured vulcanizates, containing the precipitated silicas according to the invention have a high transparency (translucence). The precipitated silicas according to the invention can therefore be incorporated in particular into highly transparent formulations. Especially in the particularly preferred embodiments, they lead to very little discolouration here.

The subjects of the present invention are described in detail below.

The precipitated silicas according to the invention have a high BET surface area of 185 to 260 $m^2/g$. In a preferred embodiment of the present invention, the BET surface area is preferably in the range from 185 to 210 $m^2/g$ and particularly preferably 190 to 205 $m^2/g$. In another preferred embodiment, the BET surface area is in the range from 210 to 260 $m^2/g$, preferably 211 to 260 $m^2/g$, particularly preferably 215 to 250 $m^2/g$ and very particularly preferably 220 to 250 $m^2/g$. The BET surface area influences the reinforcing potential of the precipitated silica. The higher the BET surface area, the greater is the reinforcement. However, a high BET surface area also leads to a deterioration of the possibility of incorporating the precipitated silica into the silicone rubber formulation. The inventors have now found that this disadvantage does not occur, i.e. very good incorporation properties can be achieved, if the precipitated silicas have a fairly low CTAB surface area and a high ratio of BET to CTAB surface area in addition to the high BET surface area.

The precipitated silicas according to the invention are therefore distinguished by a CTAB surface area of 100 to 160 $m^2/g$, preferably 110 to 150 $m^2/g$, particularly preferably 120-150 $m^2/g$ and very particularly preferably 126 to 145 $m^2/g$ and a BET/CTAB ratio of 1.2 to 2.6, preferably 1.25-2.3, particularly preferably 1.3 to 2 and very particularly preferably 1.4 to 1.9. The BET/CTAB ratio is an independent parameter, i.e. an independent characteristic of the precipitated silicas according to the invention. From the subset of the ratios which can be calculated from the ranges generally stated for the BET and the CTAB, i.e. which can theoretically be calculated therefrom, those which have these initial parameters are distinguished according to the invention by the BET/CTAB ratio. In other words, a precipitated silica according to the invention which has a CTAB of 160 $m^2/g$ must have at least a BET of 200 $m^2/g$. The CTAB surface area characterizes the rubber-accessible surface. Without being tied to a specific theory, the inventors are of the view that the BET/CTAB ratio also influences the refractive index of the precipitated silica, which refractive index reflects properties in the region of interfaces, which in turn are dependent on the differently determined surface areas of the silica used, and hence contributes to the good transparency of the precipitated silicas according to the invention.

A further important feature of the precipitated silicas according to the invention is the median particle size $d_{50}$. Thus, it has been found that particles which are too small are difficult to incorporate into the silicone rubber formulations since they float on the silicone rubber formulation and do not sink. Consequently, the incorporation time increases. Particles which are too large, on the other hand, may have problems in the dispersing of the silica in the silicone rubber mixture. The precipitated silicas according to the invention therefore preferably have a median particle size $d_{50}$ of 5 to 95 μm.

In a first specific variant of the present invention, the median particle size $d_{50}$, measured by means of laser diffraction, is in the range from 5 to 25 μm, preferably 8 to 24 μm, particularly preferably 10 to 20 μm and very particularly preferably 12 to 18 μm. Particularly preferably, the proportion of very fine particles, expressed by the $d_5$ value, in this variant is 4 to 10 μm, in particular 4.3 to 6 μm. As already indicated above, particles which are too small lead to disadvantages in the incorporation into the silicone rubber formulation. The $d_5$ value can be kept correspondingly high by suitable milling.

In a second preferred variant of the present invention, the median particle size is in the range from 25 to 95 μm, preferably 30 to 90 μm, particularly preferably 30 to 80 μm and especially preferably 40 to 75 μm. Compared with the first variant, this variant has the advantage that no milling of the dried precipitated silica is necessary. At the same time, however, a deterioration in the dispersibility may be associated with the relatively large particle size. A person skilled in the art can determine by simple manual experiments whether he is using precipitated silicas of variant 1 or of variant 2 for the respective silicone rubber formulation.

A further substantial feature of the precipitated silicas according to the invention is the low conductivity thereof, i.e. the low content of salts, such as, for example, sulphates, chlorides and nitrates. This promotes the good incorporation properties; in particular, the discolouration of compound and vulcanisate and an undesired increase in viscosity after the preparation of the silicone rubber formulations are prevented. The precipitated silicas according to the invention have a conductivity of less than 250 (μS)/cm, preferably less than 200 (μS)/cm, particularly preferably 1 to 200 (μS)/cm, very particularly preferably 5 to 150 (μS)/cm, especially preferably 5 to 100 (μS)/cm and very especially preferably 10 to 50 (μS)/cm.

The positive properties of the precipitated silicas according to the invention can be further enhanced if they have a low tamped density. Without being tied to a specific theory, the inventors are of the view that the tamped density is conducive to a particularly good dispersibility.

In a preferred embodiment of the present invention in which the median particle size $d_{50}$, measured by means of laser diffraction, is in the range from 5 to 25 μm, preferably 8 to 24 μm, particularly preferably 10 to 20 μm and very particularly preferably 12 to 18 μm and preferably at the same time the proportion of very fine particles, expressed by the $d_5$ value, is 4 to 10 μm, in particular 4.3 to 6 μm, the tamped density of the precipitated silicas according to the invention is preferably 50 to 150 g/l, particularly preferably 80 to 150 g/l, very particularly preferably 90 to 140 g/l and especially preferably 100 to 130 g/l.

In a second preferred embodiment of the present invention in which the median particle size $d_{50}$, measured by means of laser diffraction, is in the range from 25 to 95 μm, preferably 30 to 90 μm, particularly preferably 30 to 80 μm and especially preferably 40 to 75 μm, the tamped density of the precipitated silicas according to the invention is preferably 150 to 350 g/l, particularly preferably 180 to 300 g/l, very particularly preferably 200 to 300 g/l and especially preferably 210 to 290 g/l.

Preferably, the precipitated silicas according to the invention have a moisture content of less than 7% by weight. In a special variant of the present invention, the precipitated silicas according to the invention have a moisture content of 5 to 7% by weight, particularly preferably 5.5 to 7% by weight. It has in fact been found that the precipitated silicas according to the invention can be readily incorporated into extrudable HTV silicone rubber formulations, in spite of the relatively high moisture content of 5 to 7% by weight. This is surprising since considerable efforts are made in the prior art to prepare precipitated silicas having a low moisture content and low water absorption. Owing to the special parameter combination, the precipitated silicas according to the invention can be readily used as reinforcing filler for elastomer mixtures even in the case of a high moisture content. This leads to considerable cost reductions in the preparation, transport and storage of the precipitated silicas.

The precipitated silicas according to the invention preferably have a DBP absorption of 240 to 300 g/100 g, particularly preferably 250 to 300 g/100 g and very particularly preferably 260 to 290 g/100 g. Precipitated silicas having this DBP absorption possess particularly good dispersibility.

The pH of the precipitated silicas according to the invention is preferably in the range from 5 to 8, particularly preferably 6 to 7.

The precipitated silicas according to the invention can be prepared by a process which comprises the following steps:
a) preparation of an initially introduced mixture having a Y value of 10 to 30,
b) simultaneous metering of alkali metal silicate and/or alkaline earth metal silicate and acidifying agent into this initially introduced mixture with stirring at 80 to 95° C. for 60 to 90 min,
c) reacidification of the precipitation suspension,
d) ageing of the suspension for 5 to 50 min,
e) filtration, washing and drying,
and which is characterized in that the alkali metal silicate and/or alkaline earth metal silicate used in steps a) and/or b) has an alkali metal oxide or alkaline earth metal oxide content in the range from 4 to 7% by weight and a silicon dioxide content in the range from 12 to 28% by weight, in that the acidifying agent used in step b) and/or c) is an acidifying agent selected from the group consisting of concentrated mineral acids and carbonic acid (or $CO_2$ gas) and sodium hydrogen sulphite (or $SO_2$ gas) in the correspondingly possible concentrations, and in that the Y value of the precipitation suspension is kept constant at a value between 10 and 30 during the precipitation, keeping constant meaning that the Y value varies by not more 3% about the starting Y value, i.e. the value directly before the beginning of the simultaneous addition of acidifying agent and alkali metal silicate or alkaline earth metal silicate, in the course of the simultaneous addition of acidifying agent and alkali metal silicate or alkaline earth metal silicate.

The terms precipitated silica and silica are used synomously in the context of the present invention. Furthermore, the terms silicate solution and alkali metal silicate solution and/or alkaline earth metal silicate solution are used synomously. The alkali metal oxide or alkaline earth metal oxide content in the silicate solution used according to the invention is in the range from 4 to 7% by weight, preferably in the range from 5 to 6.5% by weight, particularly preferably from 5.5 to 6.5% by weight. Specifically, the silicate solution used in the process according to the invention is sodium silicate solution (waterglass) or potassium silicate solution. In a particularly preferred embodiment of the present invention, highly pure silicate solution is used. Highly pure silicate solution is characterized by a content of $Fe^{2-}$ of less than or equal to 200 mg/kg, preferably less than or equal to 180 mg/kg, particularly preferably less than or equal to 150 mg/kg, and an $Al_2O_3$ content of less than or equal to 0.55% by weight, preferably less than or equal to 0.45% by weight, particularly preferably less than or equal to 0.25% by weight.

The silicon dioxide content in the silicate solution used according to the invention is 12 to 23% by weight, preferably 13 to 23% by weight, particularly preferably 14 to 18% by weight. The modulus, i.e. the weight ratio of silicon dioxide to alkali metal oxide or alkaline earth metal oxide in the silicate solution used according to the invention is preferably 2.0 to 5.75, particularly preferably 2.5 to 4.5, very particularly preferably 3 to 4 and especially preferably 3.2 to 3.7.

In the process according to the invention, concentrated mineral acids, such as hydrochloric acid, sulpauric acid, nitric acid or phosphoric acid, or $CO_2$ are preferably used as the acidifying agent. Concentrated mineral acid means a concentration of 36 to 47.2% by weight, preferably 40 to 47% by weight, in the case of hydrochloric acid, a concentration of 90 to 98.5% by weight, preferably 93 to 98.5% by weight and very particularly preferably 96 to 98% by weight, in the case of sulphuric acid, a concentration of 60 to 68% by weight in the case of nitric acid and a concentration of 80 to 100% by weight, preferably 80 to 90% by weight, particularly preferably 80 to 85% by weight, in the case of phosphoric acid.

Furthermore, it has proved advantageous if demineralized water, preferably water purified by distillation or reverse osmosis, is used as water in at least one step of the process according to the invention, preferably at least during the washing process.

The initially introduced mixture in step a) consists of water to which a base is added, or an aqueous solution of a base; it preferably comprises at least one alkali metal silicate and/or alkaline earth metal silicate. It has proved advantageous if the initially introduced mixture is heated to a temperature of 40 to 90° C. before the beginning of the precipitation, i.e. the addition of acidifying agent and silicate solution together. By adding the silicate solution or a base, the Y value of the initially introduced mixture is adjusted to the value to be maintained during the precipitation. The adjustment of the Y value of the initially introduced mixture is preferably effected with the silicate solution which is also used for the precipitation.

The inventors have furthermore found that it is essential for the process according to the invention that the Y value remains constant in the course of the simultaneous addition of acidifying agent and alkali metal silicate or alkaline earth metal silicate, i.e. varies by not more than 3% about the starting Y value, i.e. the value directly before the beginning of the simultaneous addition of acidifying agent and alkali metal silicate or alkaline earth metal silicate. The Y value expresses the alkali metal ion concentration in the reaction solution. The Y value therefore reflects the chemical reactions during the precipitation, in particular the incorporation of ions into the silica skeleton. Inferences about the fundamental structure of the silica can be drawn therefrom and accordingly statements about the quality and reproducibility of the relevant production can be made before the physicochemical analysis of the end product. In the process according to the invention, the Y value is kept constant in the range from 10 to 30, preferably from 15 to 25 and very particularly preferably from 18 to 22 during the precipitation.

The precipitation is carried out at a temperature of 80 to 95° C., preferably 85 to 90° C. The pure precipitation time, i.e. the duration of the addition of silicate solution and acidifying agent together—without taking into account interruption times—is 60 to 90 min, preferably 65 to 85 min, very particularly preferably 70 to 80 min. The flow rates of the acidifying agent and of the silicate solution are chosen so that the desired precipitation time but at the same time also the desired Y value variation of the precipitation suspension can be maintained.

It may be particularly advantageous for the process according to the invention if high shear forces act on the precipitated silica particles in one of the steps of the process according to the invention, preferably during the precipitation or fluidizing steps, for example by means of an internal or external shearing unit.

In step c), the reacidification of the precipitation suspension is effected, preferably to a pH of 1 to 7, particularly preferably 2 to 5, very particularly preferably 3 to 4. As a result of this step, the precipitation reaction is stopped and residual waterglass in the precipitation suspension is reacted with the acidifying agent.

After the quenching of the precipitation reaction in step c), ageing of the precipitation suspension for 5 to 50 min, preferably 10 to 40 min, particularly preferably 10 to 30 min and very particularly preferably 15 to 25 min takes place in step d). This ageing step has, inter alia, an influence on the establishment of the BET and CTAB surface areas.

For the precipitated silicas according to the invention, it is not harmful if the suspension is stored for up to 48 hours after step c), for example in a suspension tank. This permits a higher flexibility of production.

The precipitated silica suspensions prepares by the process according to the invention are filtered in step e) and the filter cake is washed with water. A plurality of washing steps can be carried out. As already mentioned, it is particularly advantageous if demineralized water is used in at least one washing step. Thus, washing can preferably be effected with the normal water first and with demineralized water only in the latter stages or the last stage. This reduces the preparation costs.

The filtration, fluidization for example, according to DE 2447613) and long- or short-term drying of the silicas according to the invention are familiar to the person skilled in the art and are described, for example, in the documents mentioned in this description. The filtration and the washing of the silica preferably take place in such a way that the conductivity of the end product is less than 250 (μS)/cm, preferably less than 200 (μS)/cm, particularly preferably 1 to 200 (μS)/cm, very particularly preferably 5 to 150 (μS)/cm, especially preferably 5 to 100 (μS)/cm and very especially preferably 10 to 50 (μS)/cm.

Preferably, the silica according to the invention is dried in a pneumatic dryer, spray dryer, rack dryer, belt dryer, Büttner dryer, rotary tube dryer, flash dryer, spin-flash dryer or nozzle tower dryer. These drying variants include operation with an atomizer, a one-fluid or two-fluid nozzle or an integrated fluidized bed. Spray drying, in particular with an atomizer, is particularly preferred. This can be carried out, for example according to U.S. Pat. No. 4,094,771. Particularly preferably, the spray drying is carried out with a feed having a solids content of 15 to 20% by weight and a pH of 4 to 7, preferably 5 to 6. The spray-dried particles can have median diameters of more than 15 μm, preferably 25-95 μm, particularly preferably 30-80 μm, very particularly preferably 30-75 μm and especially preferably 40 to 75 μm, measured by means of laser diffraction. The contents of U.S. Pat. No. 4,094,771 and EP 0 937755 are hereby explicitly incorporated into the content of the present application.

In a preferred variant of the process according to the invention, the dried precipitated silicas are milled. Techniques for milling the precipitated silicas according to the invention are known to a person skilled in the art and described, for example, in *Ullmann, 5th edition, B2*, 5-20. Impact mills or opposed jet mills or mechanical mills are preferably used for milling the silicas according to the invention. The milling parameters are preferably chosen so that the median particle size $d_{50}$ of the precipitated silicas according to the invention, measured by means of laser diffraction, is in the range from 5 to 25 μm, preferably 8 to 25 μm, particularly preferably 10 to 20 μm, very particularly preferably 12 to 18 μm, and/or the $d_5$ value is in the range from 4 to 10 μm, in particular 4.3 to 6 μm.

The precipitated silicas according to the invention are preferably used as fillers in silicone rubber formulations of the RTV-1C, RTV-2C and LSR systems, in particular in HTV silicone rubber formulations.

Organopolysiloxanes which may be used are all polysiloxanes which have been used to date, or which it has been possible to use to date, as the base for organopolysiloxane elastomers in the case of room temperature vulcanizable or vulcanizing materials (RTV), materials vulcanizable or vulcanizing at only slightly elevated temperature (LTV) or high temperature vulcanizable or vulcanizing materials (HTV). They can be described, for example, by the general formula

in which radicals Z and R may be identical or different or the radicals R and Z themselves can however also be identical or different, and in which the radicals are defined as follows:
R=alkyl, alkoxy, aryl, hydroxy, hydride or alkenyl radicals having 1-50 carbon atoms, unsubstituted or substituted by O, S, F, Cl, Br, I, in each case identical or different, and/or polystyrene, polyvinyl acetate, polyacrylate, polymethacrylate and polyacrylonitrile radicals having 50-10 000 repeating units.

Z=H, OH, Cl, Br, amino, aminoxy, alkenyloxy, aryloxy or phosphate radicals, it being possible for the organic radicals to carry up to 20 carbon atoms and said organic radicals being identical or different in each case.

n=1-3

X=100-15 000, preferably 100-11 000, particularly preferably 100-8000.

Polysiloxanes especially suitable for RTV-1C silicone rubber formulations may have, for example, the following structure

$$Z_nSiR_{3-n}-O-[SiR_2O]_x-SiR_{3-n}-Z'_n$$

where R=alkyl, acetoxy, oxime, alkoxy, amido, aryl or alkenyl radicals having 1 to 50 carbon atoms, unsubstituted or substituted by O, S, F, Cl, Br, I, in each case identical or different, and/or polystyrene, polyvinyl acetate, polyacrylate, polymethacrylate and polyacrylonitrile radicals having 50-10 000 repeating units.

Z=OH, Cl, Br, acetoxy, amino, amido, aminoxy, oxime, alkoxy, alkenyloxy, acryloyloxy or phosphate radicals, it being possible for the organic radicals to carry up to 20 carbon atoms and said organic radicals being identical or different in each case.

Z'=oxime, alkoxy, amido or acetoxy radicals.

n=1-3

X=100-15 000, preferably 100-11 000, particularly preferably 100-8000.

Within or along the siloxane chain in the above-mentioned formulae, other siloxane units, generally present only as impurities, can also be present as diorganosiloxane units, for example those of the formulae $RSiO_{3/2}$, $R_3O_{1/2}$ and $SiO_{4/2}$, in which R in each case has the meanings stated above therefor. The amount of these other siloxane units should not exceed 10 mol %.

Examples of R having the meaning alkyl radical are, for example, methyl, ethyl, propyl, butyl, hexyl and octyl radicals; vinyl, allyl, ethylallyl and butadienyl radicals may be used as alkenyl radicals; and phenyl and tolyl radicals may be used as aryl radicals.

Examples of substituted hydrocarbon radicals R are in particular halogenated hydrocarbon radicals such as the 3,3,3-trifluoropropyl radical, chlorophenyl and bromotolyl radical; and cyanoalkyl radicals, such as the □ cyanoethyl radical.

Examples of polymers as radical R are polystyrene, polyvinyl acetate, polyacrylate, polymethacrylate and polyacrylonitrile radicals bonded to silicon via carbon.

Owing to the easier accessibility, the predominant part of the radicals R preferably consists of methyl groups. The other radicals R are in particular vinyl and/or phenyl groups.

Particularly in the case of the presence of formulations which are storable in the absence of water and cure on admission of water at room temperature to give elastomers, Z are hydrolysable groups. Examples of such groups are amino, aminoxy, alkenyloxy (e.g. $H_2C=(CH_3CO-)$), acyloxy and phosphate groups. Especially because of the easier accessibility, acyloxy groups, in particular acetoxy groups, are preferred as Z. Examples of hydrolysable atoms Z are halogen and hydrogen atoms. Examples of alkenyl groups Z are in particular vinyl groups.

Preferably, the viscosity of the organopolysiloxanes used in the invention does not exceed 500 000 cP at 25° C., particularly preferably 150 000 cP at 25° C. Accordingly, the value x preferably does not exceed 40 000. It is also possible to use mixtures of different organopolysiloxanes.

The mixing of these organopolysiloxanes with the silicas according to the invention and optionally the further constituents of the formulation according to the invention can be effected in any known manner, for example in mechanical mixing apparatuses. It takes place very rapidly and easily, regardless of the sequence in which the addition of the constituents of the mixture is carried out.

Preferably, the silicas used according to the invention are employed in amounts of 0.5 to 60% by weight, preferably 5% to 60% by weight, particularly preferably 10% 40% by weight and very particularly preferably 20 to 30% by weight, based on the total weight of the materials curable to give elastomers. In the case of HTV organopolysiloxane elastomers, up to 60% by weight can likewise be used.

The proportion of the abovementioned organopolysiloxanes is preferably 30-99.5% by weight, based on the total weight of the material curable to give elastomers.

If such Si-bonded hydroxyl groups are present as the only reactive terminal units in the reactive diorganopolysiloxanes containing terminal units, these diorganopolysiloxanes must be reacted in a known manner with crosslinking agents, optionally in the presence of a condensation catalyst, in order to cure them in a manner known per se or to convert them into compounds curing by the water present in the air, optionally with addition of further water, to give elastomers. In the case of HTV diorganopolysiloxane elastomers, organic peroxides, such as, for example 2,5-dimethyl-2,5-(di-tert-butylperoxy)hexane, bis-2,4-dichlorobenzoyl peroxide, benzoyl Peroxide, tert-butyl perbenzoate or tert-butyl peracetate in an amount of 0.5-5.0% by weight can be used at correspondingly advantageous temperatures.

Preferably used high temperature vulcanizing organosiloxanes are those in which the organic substituents consist of methyl, ethyl, phenyl, trifluoromethylphenyl [$F_3CC_6H_4$] or trimethylsilmethylene radicals [$(CH_3)_3SiCH_2-$], e.g. dimethyl-, diethy-, phenylmethyl-, phenylethyl-, ethylmethyl-, trimethylsilmethylenemethyl-, trimethylsilmethyleneethyl-, trifluoromethylphenylmethyl- or trifluoromethylphenylethyl-siloxanes or copolymers of such compounds. In addition, the polymers can preferably contain limited amounts of diphenylsiloxane, bistrimethylsilmethylenesiloxane, or bistrifluoromethylphenylsiloxane units and also siloxanes having units of the formula $RSiO_{1.5}$ and $R_3SiO_{0.5}$, in which R represents one of the above radicals.

The formulations according to the invention can be crosslinked by addition of silanes. The silicone rubber formulations may therefore additionally contain 0.01 to 20% by weight, preferably 0.5-5% by weight, of a crosslinking agent having the general formula where R'=alkyl, alkoxy, aryl or alkenyl radicals having 1 to 50 carbon atoms, unsubstituted or substituted by O, S, F, Cl, Br, I, in each case identical or different, and/or polystyrene, polyvinyl acetate, polyacrylate, polymethacrylate and polyacrylonitrile radicals having 5-5000 repeating units.

Z'=H, OH, Cl, Br, amino, aminoxy, alkenyloxy, aryloxy or phosphate radicals, it being possible for the organic radicals to carry up to 20 carbon atoms and to be in each case identical or different.

t=3 or 4.

Examples of silanes of the abovementioned formula are methyltriacetoxysilane, ethyltriacetoxysilane, isopropyltriacetoxysilane, isopropoxytriacetoxysilane, vinyltriacetoxysilane, methyltrisdiethylaminooxysilane, methyltris(cyclohexylamino)silane, methyltris(diethylphosphato)silane and methyltris(methylethylketoximo)silane.

It is furthermore possible for the silicone rubber formulations according to the invention additionally to contain 0.5 to 99.5% by weight, preferably 2.0 to 30.0% by weight, of an unfunctionalized polysiloxane, in addition to the organopolysiloxane and the crosslinking agent.

The polysiloxanes used here may have a viscosity of up to 500 000 cP (500 Pa·s). For example, in particular Baysilone MS (viscosity 10-20 mPa·s) or the distributor oil Si 200 (viscosity about 28 mPa·s), both available from Momentive Performance Materials, are suitable for HTV silicone rubbers according to the invention. For RTV-2C silicone rubbers, for example, the oil M 100 viscosity about 100 mPa·s) of the same manufacturer can be used.

In addition to organopolysiloxanes, the silicas according to the invention, crosslinking agents and crosslinking catalysts, formulations according to the invention can of course optionally conventionally contain fillers generally or frequently used in materials curable to give Elastomers. Examples of such substances are fillers having a surface area below 50 m$^2$/g, such as quartz powder, kaolin, phyllosilicates, tau minerals, diatomaceous earth, furthermore zirconium silicate and calcium carbonate, furthermore untreated pyrogenically produced silicon dioxide, organic resins, such as polyvinyl chloride powder, organopolysiloxane resins, fibrous fillers, such as asbestos, glass fibres, and organic pigments, soluble dyes, fragrances, corrosion inhibitors, compositions stabilizing materials to the influence of water, such as acetic anhydride, compositions retarding curing, such as benzotriazole, and plasticizers, such as dimethylpolysiloxanes endcapped by trimethylsiloxy groups. Further examples of formulation constituents and additives are carbon blacks for establishing antistatic properties or specific electrical conductivities, UV stabilizers, anti-discolouration compositions, such as, for example, the product TSF-484 (Momentive Performance Materials) or KF 99 (Shin-Etsu Silicones).

Furthermore, the silicone rubber formulations may additionally contain 0.01 to 6% by weight of organic or inorganic compounds of the metals Pt, Sn, Ti and/or Zn as a catalyst and/or 0.01 to 6% by weight of inhibitors and/or 0.01-6% by weight of fungicides or bactericides and/or 0.01 to 6% by weight of adhesion promoters.

RTV-1C silicone rubber, formulations may optionally contain 0.1-20, preferably 0.1-15, particularly preferably 0.1-10, % by weight (based on the total amount of the formulation) of water-binding substance. Suitable substances for this purpose are, for example, carboxylic anhydrides, e.g. acetic anhydride or maleic anhydride, and/or carbonic acid esters, such as, for example, diethyl carbonate, ethylene carbonate, and/or alkenyloxy compounds and/or ketals, such as for example dimethyldioxolane. It is possible to use one or more of these substances.

The quantity ranges described above are not to be regarded as being additives. The person skilled in the art understands that he must choose the components within the above-mentioned quantity ranges so that he arrives at 100% by weight altogether.

Further silicone rubber formulations or modifications of the abovementioned silicone rubber formulations are known to the person skilled in the art. Examples of these are described, for example, in EP 1557446 A1. The precipitated silicas according to the invention can also be used in these formulations.

In the context of the present invention, a particularly preferred HTV silicone rubber formulation is to be understood as meaning the following formulation constituents:
1st Formulation Constituent:
    100 parts of HTV silicone polymer, vinyl-functional polysiloxane (vinyl content about 0.15%) and having a molecular weight of 600 000 g/mol, definable by the following structural formula.
    R=methyl group, phenyl group
    R$_1$=vinyl group

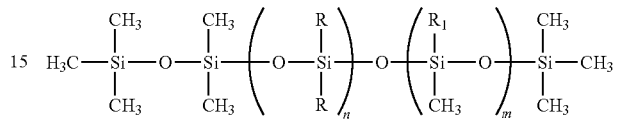

Product name: Dongjue 110-2, Manufacturer: Nanjing Dongjue, China.
2nd Formulation Constituent:
    40 parts of the precipitated silicas according to the invention.
3rd Formulation Constituent:
    3.2 parts of processing auxiliary, short-chain. OH-functional silicone oil (α,ω-dihydroxysiloxane) having an OH concentration of about 8%, definable by the following structural formula.

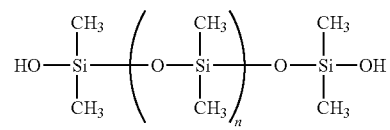

Manufacturer: Shanghai HuaRun Chemical Co., Ltd., China.
4th Formulation Constituent:
    1% of crosslinking agent, organic peroxide, (2,5-dimethyl-2,5-di-tert-butylperoxy)hexane, definable by the following structural formula.

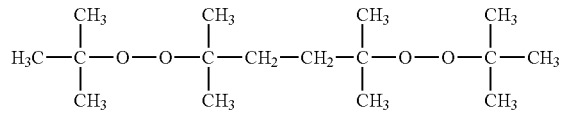

Product name: DHBP-C8BS (DHBP paste with a peroxide concentration of 45%),
Manufacturer: Qiangsheng Chemical Co., Ltd., China.

The physicochemical parameters of the precipitated silicas according to the invention and the process parameters are determined as follows.
Determination of the Y Value:
    The Y value is determined by means of sulphuric acid as standard solution and phenolphthalein as an indicator.
Reagents
    phenolphthalein solution in ethanol having a concentration of 10 g/l
    sulphuric acid solution having a concentration of 1 mol/l
Procedure
    100 ml of the sample to be investigated, e.g. a precipitation suspension, are introduced into a 500 ml beaker and about 10 ml of water and 3-5 drops of phenolphthalein solution are added. The mixture is stirred by means of a magnetic stirrer and the sulphuric acid solution is added by means of a burette until the colour of phenolphthalein changes from red to faint pink. 3-5 further drops of phenolphthalein are added and titration is continued. This process is repeated until a colour change is no longer detectable.

The Y value is calculated as follows:

$$Y = C*V*N$$

where:
C=concentration of the sulphuric acid in mol/l
V=volume of the sulphuric acid consumed in the titration, in ml
N=normality of the acid Determination of the pH of the Initially Introduced Mixture or Precipitation Suspension A sample of 50-100 ml of the initially introduced mixture or the precipitation suspension is taken and the pH is determined at 60° C.

Determination of the Solids Content of the Silica Feed Prior to Drying 10 g of sample (weight E taken) are dried in a porcelain dish (45 mm diameter) under an infrared drying lamp at 120-140° C. to constant weight. Thereafter, the sample is cooled to room temperature in a desiccator cabinet with silica gel as drying agent. The final weight A is determined gravimetrically. The solids content (SC) in % is determined according to $$SC = A/E*100\%,$$

where A=final weight in g and E=weight taken in g.

Determination of the pH of the Silica (End Product)

The determination of the pH of the silica is effected as a 5% strength aqueous suspension at room temperature on the basis of DIN EN ISO 787-9. The weights taken were changed compared with the specifications of this standard (5.00 g of silica per 100 ml of deionized water).

Determination of the Moisture Content

The moisture content of silica is determined according to ISO 787-2 after drying for 2 hours in a circulation drying oven at 105° C. This loss on drying consists predominantly of water moisture.

Determination of the BET Surface Area

The specific nitrogen surface area (referred to below as BET surface area) of the pulverulent, spherical or granular silica is determined according to ISO 5794-1/Annex D using an AREA Meter (from Ströhlein, JUWE).

Determination of the CTAB Surface Area

The method is based on the adsorption of CAB (N-hexadecyl-N,N,N-trimethylammonium bromide) on the "external" surface of the silica, according to ASTM 3765 or NFT 45-007 (section 5.12.1.3).

The adsorption of CTAB takes place in aqueous solution with stirring and ultrasonic treatment. Excess, unadsorbed CTAB is determined by back-titration with NDSS (sodium dioctyl sulphosuccinate solution, "Aerosol OT" solution) using a titroprocessor, the end point being given by the maximum of the turbidity of the solution and being determined using a phototrode. The temperature during all operations carried out is 23-25° C., in order to prevent CTAB from crystallizing out. The back-titration is based on the following equation:

$$(C_{20}H_{37}O_4)SO_3Na + BrN(CH_3)_3(C_{16}H_{33}) \Rightarrow$$
$$NDSS$$
$$(C_{20}H_{37}O_4)SO_3N(CH_3)_3(C_{16}H_{33}) + NaBr$$
$$CTAB$$

Apparatuses

METTLER Toledo type DL 55 titroprocessor and METTLER Toledo type DL 70 titroprocessor, equipped in each case with: pH electrode, Mettler brand, type DG 111 and phototrode, Mettler brand, type DP 550
100 ml polypropylene titration beaker
150 ml titration glass vessel with cover
Pressure filtration apparatus, 100 ml capacity
Membrane filter comprising cellulose nitrate, pore size 0.1 μm, 47 mm diameter, e.g. Whatman (Order No. 7181-004)

Reagents

The solutions of CTAB ($C_{CTAB}$=0.015 mol/l in deionized water) and NDSS (concentration=0.00423 mol/l in deionized water) are obtained in ready-to-use form (from Bernd Kraft GmbH, 47167 Duisburg: Order No. 6056.4700 CTAB solution of concentration 0.015 mol/l; Order No. 6057.4700 NDSS solution 0.00423 mol/l), stored at 25° C. and used within one month.

Procedure

1. Blank Titration

The consumption of NDSS solution for the titration of 5 ml of CTAB solution should be checked once a Jay before each measurement series. For this purpose, the phototrode is set at 1000±20 mV before the beginning of the titration (corresponding to a transparency of 100%).

Exactly 5.00 ml of CTAB solution are pipetted into a titration beaker and 50.0 ml of deionized water are added. While stirring, the titration with NDSS solution is effected by the method of measurement familiar to those skilled in the art, using the DL 55 titroprocessor, up to maximum turbidity of the solution. The consumption $V_A$ of NDSS solution is determined in ml. Each titration should be carried out as a triple determination.

2. Adsorption 10.0 g of the pulverulent, spherical or granular silica having a moisture content of 5±2% (moisture content is optionally adjusted by drying at 105° C. in a drying oven or uniform moistening) are comminuted using a mill (from Krups, Model KM 75, article No. 2030-70) for 30 seconds. Exactly 500.0 mg of the comminuted sample (weight E taken) are transferred to a 150 ml titration vessel with magnetic stirring rod, and exactly 100.0 ml of CTAB solution ($T_1$) are metered in. The titration vessel is closed with a cover and stirred with an Ultra Turrax T 25 stirrer (stirrer shaft KV-18G, 18 mm diameter) at 18 000 rpm for not more than 1 min until wetting is complete. The titration vessel is screwed to the DL 70 titroprocessor and the pH of the suspension is adjusted to a value of 9±0.05 with KOH (0.1 mol/l).

Ultrasonic treatment of the suspension for 4 minutes is effected in the titration vessel in an ultrasonic bath (from Bandelin, Sonorex RK 106 S, 35 kHz, 100 W effective or 200 W peak power) at 25° C. Thereafter, immediate pressure filtration through a membrane filter at a nitrogen pressure of 1.2 bar is effected. The forerun of 5 ml is discarded.

3. Titration 5.00 ml of the remaining filtrate are pipetted into a 100 ml titration beaker and made up to 50.00 ml with deionized water. The titration beaker is screwed to the DL 55 titroprocessor and the titration with NDSS solution is effected with stirring to maximum turbidity. The consumption $V_B$ of NDSS solution in ml is determined. Each titration should be carried out as a triple determination.

Calculation $$CTAB(\text{not moisture-corrected}) = \frac{V_A \cdot V_B}{V_A} \cdot \frac{C_{CTAB} \cdot M_{CTAB} \cdot T_1 \cdot P}{E}$$

$V_A$ consumption of NDSS solution in ml in the titration of the blank sample
$V_b$=consumption of NDSS solution in ml on use of the filtrate
$C_{CTAB}$=concentration of the CTAB solution in mol/l
$M_{CTAB}$=molar mass of CTAB=364.46 g/mol
$T_1$=added amount of CTAB solution in l
P=space requirement of CTAB=578.435 m²/g
E=weight of silica taken The CTAB surface area is based on the anhydrous silica, and it is for this reason that the following correction is carried out.

$$CTAB = \frac{CTAB(\text{not moisture-corrected}) \text{ in } m^2/g \cdot 100\%}{100\% - \text{moisture content in \%}}$$

The moisture content of the silica is determined according to the described method "Determination of the moisture content".

Determination of the DBP Absorption

The DBP absorption (DBP number), which is a measure of the absorptivity of the precipitated silica, is determined on the basis of the standard DIN 53601, as follows:

12.50 g of pulverulent or spherical silica having a moisture content of 0-10% (the moisture content is optionally adjusted by drying at 105° C. in a drying oven) are introduced into the kneader chamber (article number 279061) of the Brabender absorptometer "E" (without vaporization of the exit filter of the torque transducer). In the case of granules, a sieve fraction of 1 to 3.15 mm (stainless steel sieves from Retsch) is used (by gentle pressing of the granules with a plastic spatula through the sieve of 3.15 mm pore size). With constant mixing (circulation speed of the kneader blades 125 rpm), dibutyl phthalate is added dropwise at a rate of 4 ml/min to the mixture at room temperature by means of the "Dosimat Brabender T 90/50". Mixing requires only a little force and is monitored on the basis of the digital display. Towards the end of the determination, the mixture becomes pasty, which is indicated by means of a steep increase in the force required. At a display of 600 digits (torque of 0.6 Nm), both the kneader and the DBP metering are switched off by an electrical contact. The synchronous motor for the DBP feed is coupled to a digital counter so that the consumption of DBP can be read in ml.

The DBP absorption is stated in g/(100 g) and calculated on the basis of the following formula:

$$DBP = \frac{V \cdot D \cdot 100}{E} \cdot \frac{g}{100 \text{ g}} + K$$

where DBP=DBP absorption in g/(100 g)
V=consumption of DBP in ml
D=density of DBP in g/ml (1.047 g/ml at 20° C.)
E=weight of silica taken in g
K=correction value according to moisture correction table in g/(100 g)

The DBP absorption is defined for the anhydrous, dried silica. With the use of moist precipitated silicas the correction value K should be taken into account for calculating the DBP absorption. This value can be determined with the following correction table; for example, a water content of 5.8% in the silica would mean an addition of 33 g/(100 g) for the DBP absorption. The moisture content of the silica is determined according to the method "Determination of moisture content or of the loss on drying".

TABLE 1

Moisture correction table for dibutyl phthalate absorption (anhydrous)

| % moisture | .0 | .2 | .4 | .6 | .8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 21 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of the Electrical Conductivity

The determination of the electrical conductivity of silicas is carried out as a 4% strength aqueous suspension at room temperature on the basis of DIN EN ISO 787-14. The weights taken were changed compared with the specifications of this standard (4.00 g of silica per 100 ml of ceionized water).

Determination of the Particle Size by Means of Laser Diffraction

The use of laser diffraction for, determining particle sizes of powders is based on the phenomenon that particles scatter monochromatic light with a different intensity pattern in all directions. This scattering is dependent on the particle size. The smaller the particles, the greater are the scattering angles.

The sample preparation and measurement (washing of the module, etc.) are effected with a dispersion liquid (0.05 m-% Tetra-Sodium-diphosphate in demineralised water) in the case of hydrophilic precipitated silica. With pure ethanol/water mixture (ration by volume 1:1) in the case of precipitated silica not sufficiently wettable with water.

Before the beginning of the measurement, the laser diffraction apparatus LS 230 (from Beckmann Coulter, Art.-No. 6605210) and the liquid module (Small Volume Module Plus, 120 ml, from Beckmann Coulter with internal ultrasonic finger (diameter 6 mm), Art.-No. 6605506) including a ultrasonic processor SONICS Vibracell (Modul VCX 130) are allowed to warm up for 2 h and the module is washed three times with the dispersion liquid, calibrated, and washed three times with ethanol/water mixture in the case of hydrophobic precipitated silicas.

In the control bar of the apparatus software (e.g. Version 3.29), the window "calculate Opt. model" is selected via the menu option "Measurement" and the refractive indices are specified in an .rfd file: liquid refractive index R.I. real=1.332 (1.359 for ethanol); material refractive index real=1.46; imaginary=0.1; form factor 1. In the window "sample info", "sample name", "file name" for saving the data of the measurement, "dispersion liquid" are defined and confirmed with "OK". Thereafter in the control bar "measurement cycle" is chosen. In this window as a first step "new sample" has to be confirmed, followed by definition respectively activation of: "offset measurement", "adjustment", "background measurement", "set sample concentration", "input sample info" (necessary for confirmation of the sample defined in "sample info"), "start 1 measurement" and deactivation of PIDS function. In addition the optical model "Fraunhofer-rfd" is chosen, "size distribution" (make hook at "during measurement") and "safe data" are activated. The pump speed is set on the apparatus (respectively at the Small Volume Modul) to 30%.

Suspensions are prepared from the silica samples to be investigated. In the case of milled products a redispersion is conducted by ultrasonic treatment for 1 minute by means of ultrasonic processor model VC 70 T from Vibra Cell (70 W) and an ultrasound finger CV 181. In the case of unmilled products, the dispersing is effected by circulation for 1 minute by means of a pump in the Small Volume Module Plus. Thereafter, the homogeneous suspension of 1 g of silica in 40 ml of demineralized water is added by means of a 2 ml one-way pipette to the liquid module of the apparatus in such a way that a constant concentration with a light absorption of 8 to 12% is achieved and the apparatus reports "OK". The measurement is effected at room temperature. From the raw data curve, the software calculates the particle size distribution ($d_5$ value) and the $d_{50}$ value (median value) on the basis of the volume distribution taking into account the Mie theory and the optical model parameters (.rfd file).

Determination of the Tamped Density

The determination of the tamped density was effected according to DIN EN ISO 787-11.

Determination of the $Fe^{2+}$ and of the $Al_2O_3$ Content of the Waterglass

Measurement Principle

The silicate solutions evaporated to dryness are heated in a mixture of hydrofluoric acid and sulphuric acid. This results in the formation of gaseous silicon tetrafluoride, which is evaporated with fuming, and the silicon is thus removed. The metal salts remaining behind are taken up in hydrochloric acid and diluted with water.

Iron Content

The iron content of the metal salt solution is determined by means of atomic absorption spectroscopy by measurement of the light absorption at a wavelength of 248.3 nm.

Aluminium Content

The determination of the aluminium content is effected calorimetrically by means of a stable ternary aluminium-chromazurine S-cetylpyridinium bromide complex.

Reagents Required (The numbers in Brackets represent the content: of the reagent respectively deionised water in the mixture in (parts by volume/parts by volume). The first number stands for the content of the reagent while the second number represents the content of deionised water).

Ascorbic acid solution 2% by weight in distilled water (freshly prepared before use)

o-Phenanthroline solution 1% by weight is prepared with an ethanol solution 100 ml (1+1).

Chromazurine S solution 0.2% by weight is prepared with an ethanol solution 100 ml (1+3).

Cetylpyridinium bromide solution 0.4% by weight cetylpyridinium bromide solution 100 ml (1+3).

Al standard solution 1000 μg/ml.

Al standard solution 10 μg/ml is prepared by introducing 1 ml of the Al standard solution of 1000 μg/ml and 2 ml of hydrochloric acid solution into a 100 ml graduated flask and making up to 100 ml with distilled water.

Sulphuric acid 98%

Hydrochloric acid 36%

Hydrochloric acid (2+5) (V/V)

Hydrofluoric acid 40%

Cu standard solution, 1000 μg/ml.

Fe standard solution, 1000 μg/ml.

Mn standard solution, 1000 μg/ml

Mixed solution of Cu, Fe, Mn having a metal content of 10 μg/ml is prepared by introducing in each case 1 ml of the Fe, Mn and Cu standard solutions and 2 ml of concentrated hydrochloric acid into a 100 ml graduated flask and diluting to the mark with distilled water.

Mixed solutions of Cu, Fe, Mn having metal contents of 0, 0.2, 0.4, 0.6, 0.8 μg/ml are prepared in each case in 250 ml graduated flasks by dilution with distilled water.

Apparatuses Required

GGX-9 AAS spectrometer, Beijing Kechuang Heiguang Instrument Co., Ltd 721E spectrometer, Shanghai Analytical Instrument. Factory, China 10 ml, 100 ml and 150 ml graduated flasks 1, 2, 3, 5, 10, 15, 20 ml volumetric pipettes Drying oven of 105±2° C.

Analytical balance having an accuracy of ±0.1 mg

Desiccator with silica gel

Weighing bottle with cover

Sample Preparation

The concentrated waterglass solution is dried for 1.5 h at 105° C. in an oven and allowed to cool. 1.5 g (±0.1 mg) of the dried sample is wetted with deionized water in a platinum crucible and mixed with 10 ml of hydrofluoric acid and 0.5 ml of sulphuric acid. The mixture is concentrated by means of a heating stirrer until white fumes form and is allowed to cool, 5 ml of hydrofluoric acid are added again and concentration is effected again until white fumes form. The cooled residue is taken up with 5 ml of hydrochloric acid and heated until all solids have dissolved. The cooled solution is transferred to a 20 ml flask and diluted to the 10 ml mark with distilled water. Test solution A is thus obtained.

Carrying Out the Measurements

Determination of the Iron Content (Fe mg/kg)

The AAS spectrometer GGX-9 is switched on and allowed to warm up for 15 minutes until it is ready for operation. 1 ml of test solution A is transferred to a 100 ml graduated flask, 2 ml of hydrochloric acid are added and the solution is made up to the 100 ml mark with distilled water. Test solution B is thus obtained. The analysis of the sample is effected with consultation of the operating instructions of the AAS spectrometer. Calibration solutions with 0, 0.2, 0.4, 0.6 and 0.8 μg of iron/ml are used.

Determination of the $Al_2O_3$ Content in %

Recording of the Calibration Curve 0, 10, 20, 30 and 50 μg (addition of 0, 1, 2, 3 and 5 ml of an Al calibration solution having an Al content of 10 μg/ml) are introduced into a 100 ml graduated flask. Thereafter, 1 drop of nitrophenol (0.1% by weight) is added, diluted with 20 ml distilled water, 2% by weight of nitric acid and 2% by weight of ammonia solution are added so that the yellow solution becomes colourless. Immediately thereafter, 5 ml of a 4% by weight nitric acid are added and thoroughly mixed. After 20-30 minutes, 1 ml of ascorbic acid is added and shaking is vigorously effected again. This is followed by dilution of the solution to 70 ml with distilled water and addition of 5 ml of a 0.2% strength by weight chromazurine S solution and 5 ml of a 0.4% strength by weight cetylpyridinium bromide solution and 5 ml of a 30% strength by weight hexamethyltetramine solution. The mixture is vigorously shaken and is allowed to stand for 10 minutes. The light absorption of this calibration solution is then measured by means of a 721E spectrometer at a wavelength of 620 nm in a 5 cm absorption vessel. The calibration curve is recorded in a coordinate system in which the absorbance is plotted along the horizontal axis and the aluminium content in μg along the vertical axis. The gradients $k_1$ for Al and $k_2$ for $Al_2O_3$ are determined, where $k_2=51/27 \times k_1$.

Analysis of the Sample

For determining the aluminium oxide content, in each case 2 ml of test solution B (cf. determination of the iron content above) and of the blank solution are initially introduced into a 100 ml graduated flask and the procedure for recording the calibration curve is then adopted.

The following examples serve for illustration and for understanding of the present invention but do not limit the scope thereof in any way.

EXAMPLE 1

45.94 m³ of water are initially introduced into a precipitation container having a capacity of 85 m³ and 5.08 m³ of waterglass (Be=29.0; weight ratio of $SiO_2$ to $Na_2O=3.23$) are added. The initially introduced mixture is then heated to 64.1° C. The Y value of the initially introduced mixture at the beginning of the precipitation, i.e. the addition of waterglass and sulphuric acid together (about 98.0±0.5% by weight) to the initially introduced mixture, is 19.65. Within 75 min, waterglass (as specified above) and sulphuric acid (as specified above) are then added while maintaining a constant precipitation temperature of 87° C. (maximum variation±0.2° C.) and with introduction of shear energy by means of a turbine, in such a way that the Y value remains constant, i.e. is subject to a maximum variation of ±1.9% about the starting value. After 75 min, the addition of waterglass is stopped and the sulphuric acid is further added until a pH of 3.68 is reached. Thereafter, the suspension is stirred for 20 min at a pH between 3.68 and 3.74.

The suspension obtained is filtered with a chamber filter press and the filter cake is washed with water. The filter cake is then fluidized in a dissolver. The silica feed having a solids content of about 18.9% by weight and a pH of about 5.7 is then spray-dried so that a pH of 6.3, measured as 5% strength suspension, is established in the end product.

The spray-dried product is then milled by means of a mechanical mill having a classifier (Vortex Pulverizing Mill QWJ-60).

The physicochemical data of a representative sample of the spray-dried and unmilled product obtained (Example 1a) and of the milled product (Example 1b) are listed in Table 2.

EXAMPLE 2

20.52 m³ of water are initially introduced into a precipitation container having a capacity of 45 m³ and 2.42 m³ of waterglass (Be=23; weight ratio of $SiO_2$ to $Na_2O=3.28$; $SiO_2$ content=14.7±0.5% by weight) are added. The initially introduced mixture is then heated to 86° C. The Y value of the initially introduced mixture at the beginning of the precipitation, i.e. the addition of waterglass and sulphuric acid together (about 98.0±0.5% by weight) to the initially introduced mixture, is 20.35. Within 75 min, waterglass (as specified above) and sulphuric acid (as specified above) are then added while maintaining a constant precipitation temperature of 86° C. (maximum variation±0.2° C.) in such a way that the Y value remains constant, i.e. is subject to a maximum variation of ±3.1% about the starting value. After 75 min, the addition of waterglass is stopped and the sulphuric acid is further added until a pH of 3.74 is reached. Thereafter, the suspension is stirred for 20 min at a pH between 3.74 and 3.78.

The suspension obtained is filtered with a chamber filter press and the filter cake is washed with water which was fully demineralized beforehand via reverse osmosis. The filter cake is then fluidized in a dissolver. The silica feed having a solids content of about 18.2% by weight and a pH of about 5.7 is then spray-dried so that a pH of 6.5, measured as 5% strength suspension, is established in the end product.

The spray-dried product is then milled by means of a mechanical mill having a classifier (Vortex Pulverizing Mill QWJ-60).

The physicochemical data of a representative sample of the spray-dried and unmilled product obtained (Example 2a) and of the milled product (Example 2b) are listed in Table 2.

COMPARATIVE EXAMPLES 1 to 4

A conventionally prepared standard silica Ultrasil VN3 from Evonik Degussa GmbH was chosen as Comparative Example 1. In Comparative Examples 2 to 4, precipitated silicas which are developed and sold specially for the reinforcement of silicone rubber elastomers were chosen. Comparative Example 2 is Nipsil LP from Nippon Silica. In Comparative Examples 3 and 4, two different samples of Zeosil 132 from Rhodia Chimie were tested. These two samples show very different properties. The reason is not known to the applicant. It might be, for example, that Rhodia Chimie sells different product qualities under the same name.

TABLE 2

Physicochemical properties of different silicas

| | Example 1a | Example 1b | Example 2a | Example 2b | Comparative Example 1 | Comparative Example 2 | Comparative Example 3 | Comparative Example 4 |
|---|---|---|---|---|---|---|---|---|
| Moisture content (% by wt.) | 6.0 | 6.6 | 6.0 | 6.7 | 5.5 | 7.9 | 6.4 | 6.4 |
| BET (m²/g) | 249 | 241 | 231 | 223 | 181 | 208 | 183 | 166 |
| CTAB (m²/g) | 138 | 136 | 143 | 143 | 146 | 164 | 130 | 124 |
| DBP, based on dried substance (g/100 g) | 280 | 267 | 280 | 271 | 252 | 250 | 262 | 260 |

TABLE 2-continued

Physicochemical properties of different silicas

|  | Example 1a | Example 1b | Example 2a | Example 2b | Comparative Example 1 | Comparative Example 2 | Comparative Example 3 | Comparative Example 4 |
|---|---|---|---|---|---|---|---|---|
| Median particle size $d_{50}$ (μm) | 55.2 | 15.6 | 88.7 | 15.9 | 137.5 | 15.8 | 11.9 | 17.5 |
| Particle size $d_5$ (μm) | 10.0 | 4.5 | 11.3 | 5.3 | 11.8 | 5.6 | 5.1 | 5.6 |
| Tamped density (g/l) | 245 | 105 | 236 | 112 | 274 | 153 | 173 | 119 |
| pH | 6.3 | 6.4 | 6.5 | 6.5 | 6.1 | 5.6 | 6.2 | 6.3 |
| Conductivity (μS/cm) | 146 | 136 | 26 | 30 | 656 | 66 | 166 | 392 |

EXAMPLE 3

The comparative experiments shown in Table 3 are based on compounding by means of a laboratory kneader. The comparative experiments shown in Table 4 are once again based on compounding by means of a two-roll mill. The experiments were carried out as follows:

Apparatuses:
1. Laboratory kneader with thermostat, model No.; HI-KD-5 (from Hongyi, Taiwan).
2. Two-roll mill, model No.: LRM-S-110/3E (from Labtech, Taiwan).
   Roll diameter: 100 mm
   Roll length: 200 mm
   Roll nip: 1.0+/−0.05 mm
   Speed: 15 rpm/20 rpm
   Friction: 1:1.3
3. Heating press, model No.: GT-7014-A50 (from Gotech, China).
   Pressure: 0-50 t
   Temperature range: RT-300° C.
   Press area: 315·288 mm
4. Two stainless steel plates having the dimensions 330 mm 330 mm·2 mm and a spacer plate of the same thickness with 4 recesses having the dimensions 130 mm·130 mm and two stainless steel plates having the dimensions 300 mm 300 mm·6 mm and a spacer plate of the same thickness with 2 recesses having the dimensions 60 mm·60 mm.
5. High-temperature oven (from ESPEC, China).
6. Tensile tester (from Gotech, China).
7. Datacolor (Datacolor 400™).
8. Further testers for measuring the hardness (Shore A), Williams plasticity and sample thickness (from Gotech, China).
9. Laboratory balance, accuracy at least ±0.01 g.

Raw Materials Used:
   HTV Polymer:
   Dongjue 110-2 molecular weight 600 000 g/mol, vinyl content: 0.15%, from Nanjing Dongjue, China
   Distributor oil/processing auxiliaries:
   α,ω-Dihydroxysiloxane, content OH functional groups approx.: 8%, from Shanghai HuaRun Chemical, China.
   Crosslinking agent/organic peroxide:
   DHBP-C8BS paste (45%) from Qiangsheng Chemical. Co., Ltd., China.
   Silicas according to the invention and comparative products (cf. Table 2)

Experimental Section:
Part 1 Compounding by Means of Laboratory Kneader
   Formulation:
   100 parts of HTV polymer (1500 g)
   40 parts of silica (600 g)
   3.2 parts of distributor oil/processing auxiliaries (48 g)
   1.0% of crosslinking agent/organic peroxide
   Compounding/Preparation:
   After adjustment of the rotational speed of tae kneader tool to 20 rpm, 1500 g of HTV polymer are introduced into the kneader chamber. The silica and the processing auxiliary were then added at room temperature in four portions of (40%, 25%, 20% and 15%).
   1. 40% by weight=240 g of silica+19.2 g of processing auxiliary
   2. 25% by weight=150 g of silica+12.0 g of processing auxiliary
   3. 20% by weight=120 g of silica+9.6 g of processing auxiliary
   4. 15% by weight=90 g of silica+7.2 g of processing auxiliary After complete dispersing of the silica, the incorporation time required for the silica was determined (noted). After incorporation of the complete amount of silica, the heating power of the kneader thermostat is set at 170° C. and compounding is then effected for two hours at a temperature of 170° C. (without vacuum). Thereafter, further dispersing in the kneader is effected for 0.5 hour in vacuo but without heating (cooling process). After cooling of the compound, the Williams plasticity (according to ASTM D 926-67) was measured after 24 h. Before the measurement of the optical properties of the compound, special compound test specimens must be prepared. For the preparation of the 6 mm thick compound test specimens, 2 stainless steel plates having the dimensions 300 mm·300 mm·6 mm and a spacer plate of the same thickness with two recesses having the dimensions 60 mm·60 mm are used.

The preparation of the 6 mm HTV compound test specimens (weight taken: 2 times 25 g of compound) is effected in the heating press at room temperature (without addition of the crosslinking agent/peroxide) for 1 min and at a pressure of about 6 bar (6 mPa).

After preparation of uniform test specimens, the measurement of the optical properties of the compound by means of Datacolor 400 can be effected.

The following were determined:
1. l, a, b values, yellow discolouration according to the standard ASTM E 313/DIN 6167.
2. Turbidity according to the standard DIN 53146.
3. Transparency according to the standard DIN 53147.

After cooling of the compound and after storage for 24 hours, the vulcanization of the compound can be effected—as described in Part 3—for determining further performance characteristics.

Part 2 Compounding by Means of a Two-Roll Mil:

Formulation:
100 parts of HTV polymer (200 g)
40 parts of silica (80 g)
3.2 parts of distributor oil/processing auxiliary (6.4 g)
1.0% of crosslinking agent/organic peroxide Compounding/Preparation:

After the two-roll mill has been switched on, important working parameters, such as roll nip (1.0+/−0.05 mm) and dispersing speed (20 rpm/15 rpm, i.e. a friction of 1:1.3), are set.

At room temperature, 200 g of HTV polymer are applied to the two-roll mill and dispersed until the compound is present in homogenized form, i.e. the faster roll is completely coated with said compound and has a smooth surface. For this purpose, the two-roll mill is stopped and about 10% of the amount of silica (total amount of silica is 80 g) are introduced in the middle between the two rolls. Thereafter, the complete amount of processing auxiliary (6.4 g of distributor oil) is metered to the silica already applied. By starting the two-roll mill again, the incorporation of the silica into the polymer is now achieved. The addition of further amounts of silica is effected very slowly and stepwise. After about 50% of the total amount of silica were added and incorporated, the compound is removed from the roll, folded and applied again to the roll. The remaining 50% of silica are now incorporated stepwise. Small amounts of silica may fall under the two-roll mill through the roll nip. In this context, it should be ensured that the amounts of this silica are collected on a clean underlay and applied to the two-roll mill again for complete incorporation.

After complete incorporation of the silica and as soon as the compound is present in homogenized form, i.e. the faster roll is completely coated with said compound and said compound has a smooth surface, the incorporation time required for the silica is determined (noted).

The homogenization of the compound is now continued in order to ensure the complete dispersing of the silica. During this procedure, the compound is removed a further five times from the two-roll mill, folded and applied again. The total subsequent dispersing time should be not more than 5 minutes. After the compounding, the compound is removed from the roll in the form of a single long compound hide. The compound hide is now folded into 4 uniform layers and stored on a stainless steel plate at 170° C. for one hour in a hot-air oven.

After this heating, the compound is removed from the oven and is stored for one hour at room temperature for cooling. Thereafter, the compound is again plasticized by rolling with 5-10 minutes (depending on silica properties), i.e. applied again to the two-roll mill and dispersed until the compound is present in homogenized form, i.e. the faster roll is completely coated with said compound and said compound has a smooth surface.

Thereafter, the compound is removed from the roll and the determination of the Williams plasticity (according to ASTM D 926-67) and the preparation of special compound test specimens for the determination of the optical, properties of the compound, as also described in Part 1, follow. Thereafter, the vulcanization of the compound—as described in Part 3—can also be effected for determining further performance characteristics.

Part 3 Vulcanization:

The vulcanization is effected after compounding by means of a laboratory kneader or after compounding by means of a two-troll mill.

For determining the performance characteristics, vulcanizates or HTV test specimens having a thickness of 2 mm (for determining the tensile strength, elongation at break and tear propagation resistance) and having a thickness of 6 mm (for determining the hardness and the optical properties of the HTV vulcanizates) are required.

After the two-roll mill has been switched on, important working parameters, such as roll nip (1.0+/−0.05 mm) and dispersing speed (20 rpm/15 rpm, i.e. a friction of 1:1.3), are set.

At room temperature, the required amount of HTV compound is applied to the two-roll mill and dispersed until a completely replasticized compound (compound plasticized by rolling) has formed.

As soon as the compound is present in homogenized form, i.e. the faster roll is completely coated with said compound, the peroxide addition can be effected.

1.0% by weight of DHBP-45-PSI (2,5-dimethyl-2,5-di-tert-butylperoxy)hexane based on the mass of compound used, are now added and dispersed.

In order to ensure good dispersing of the peroxide, dispersing is effected for a further 8 minutes. During this rolling time, the compound is removed from roll 8 times altogether, folded and applied again to the roll.

After the peroxide has been dispersed, the compound is now stored for 24 hours away from dust. Before the actual vulcanization, the compound is completely replasticized again by rolling.

After the heating press has been preheated to 170° C., the actual vulcanization is effected. For this purpose the following polished stainless steel plates are used:

For the 2 mm thick test specimens, 2 stainless steel plates having the dimensions 330 mm·330 mm·2 mm and a spacer plate of the same thickness with 4 recesses having the dimensions 130 mm·130 mm are used.

For the 6 mm thick test specimens, 2 stainless steel plates having the dimensions 300 mm·300 mm·6 mm and a spacer plate of the same thickness with 2 recesses having the dimensions 60 mm·60 mm are used.

The vulcanization of the 2 mm HTV test specimens (weight taken: 4 times 35 g of compound) is effected in the heating press at 170° C. for 7 min and at a pressure of about 15 bar (15 mPa).

The vulcanization of the 6 mm HTV test specimens (weight taken: 2 times 25 g of compound) is effected in the heating press at 170° C. for 10 min and at a pressure of about 15 bar (15 mPa).

What is important is that the stainless steel plates used for the vulcanization must be cooled to room temperature before reuse, since otherwise the optical properties of the vulcanizates may be adversely effected.

In order to ensure complete vulcanization and, to remove cleavage products from the vulcanizates, all test specimens are subsequently postvulcanized in a high-temperature circulation oven (at least 120 l of fresh air per minute and per kg of HTV vulcanizate are required) at 200° C. for 4 hours.

The performance characteristics shown in Table 3 and Table 4 can be tested after storage of the HTV vulcanizates in a conditioned room or conditioned chamber according to the requirements of the respective method of measurement. The following standard test methods were chosen for determining the comparative data:

Hardness (Shore A): DIN 53 505
Tensile strength and elongation at break: ISO 37

Tear propagation resistance: ISO 34-1
Optical Properties
Yellow discolouration, l, a, b values: ASTM E 313/DIN 6167
Turbidity: DIN 53146.
Translucence: DIN 53147.

silicas according to the invention. The same applies to the compound lightness, since the precipitated silicas according to the invention are clearly distinguished from Comparative Example 1, and Examples 1a, 1b, 2a from Comparative Example 2. Even the very good values of Comparative Example 4 are surpassed here.

TABLE 3

Performance characteristics of different silicas in HTV silicone rubber - compounding by means of laboratory kneader

| | Example 1a | Example 1b | Example 2a | Example 2b | Comparative Example 1 | Comparative Example 2 | Comparative Example 3 | Comparative Example 4 |
|---|---|---|---|---|---|---|---|---|
| Compound properties | | | | | | | | |
| Incorporation time of the silica (min) | 98 | 80 | 104 | 98 | 150 | 97 | 113 | 83 |
| Williams plasticity | 200 | 211 | 228 | 198 | 220 | 190 | 213 | 177 |
| Compound translucence (%) | 86.2 | 85.4 | 86.3 | 81.1 | 76.7 | 73.8 | n.d. | 84.2 |
| Compound lightness, l value (%) | 82.6 | 83.1 | 83.7 | 79.2 | 77.3 | 79.4 | 84.0 | 84.4 |
| Compound a value | 0.6 | 0.9 | 1.1 | 1.3 | 1.2 | 1.9 | 0.8 | 0.7 |
| Compound b value | 7.7 | 7.9 | 6.6 | 7.3 | 7.4 | 6.5 | 7.4 | 6.9 |
| Cured and postvulcanized HTV silicone rubber elastomer | | | | | | | | |
| Hardness (Shore A) | 52 | 51 | 55 | 53 | 50 | 58 | 56 | 46 |
| Tensile strength (N/mm$^2$) | 4.7 | 7.0 | 6.2 | 7.7 | 6.0 | 7.2 | 7.4 | 7.3 |
| Elongation at break (%) | 286 | 340 | 346 | 389 | 300 | 330 | 338 | 409 |
| Tear propagation resistance (N/mm) | 14.3 | 13.8 | 15.9 | 14.7 | 17.1 | 15.6 | 17.6 | 13.5 |
| Translucence | 87.9 | 89.5 | 88.1 | 84.8 | 80.7 | 79.9 | 77.9 | 87.9 |
| Lightness (l value) | 80.6 | 79.1 | 81.1 | 78.2 | 74.4 | 76.6 | n.d. | 81.5 |
| a value | −0.6 | −0.3 | −0.7 | −0.5 | 2 | −0.6 | n.d. | 0.2 |
| b value | 20.1 | 20.5 | 16.8 | 17.2 | 23.7 | 20.1 | n.d. | 15.5 |
| Yellow discolouration | 30.7 | 32.0 | 24.3 | 26.1 | 41.4 | 31.6 | 28.7 | 22.4 |

Interpretation of the Test Results from Table 3

The precipitated silicas according to the invention (Examples 1a, 1b, 2a and 2b) have substantially reduced incorporation time in comparison with conventionally prepared precipitated silicas (Comparative Example 1), i.e. they can be more rapidly incorporated and more rapidly dispersed/homogenized. If only the precipitated silicas according to the invention (Examples 1b and 2b) are considered, they too have substantially more advantageous incorporation times than precipitated silicas which are already available on the market and are offered especially for silicone rubber applications (Comparative Example 3). The Williams plasticity, a measure of the thickening and the rheological properties of the compounds, is comparable for all examples shown in Table 3. A further advantage of the precipitated silicas according to the invention is found on consideration of the compound translucency.

In this respect, the comparison of the Examples 1a, 1b, 2a and 2b with Comparative Examples 1 and 2 shows that the compound translucency as a measure of the compound transparency is at an extremely high level for all precipitated silicas according to the invention. The same applies to the compound lightness, since the precipitated silicas according to the invention are clearly distinguished from Comparative Example 1, and Examples 1a, 1b, 2a from Comparative Example 2. Even the very good values of Comparative Example 4 are surpassed here.

The lower Shore A hardness of the precipitated silicas according to the invention (Examples 1a, 1b, 2a and 2b) in direct comparison with Comparative Examples 2 and 3 is likewise advantageous since a lower vulcanizane hardness permits increased silica addition (based on the formulation). This means that better mechanical properties could be achieved by addition of more silica at theoretically the same hardness. The mechanical properties, such as, for example, tensile strength and tear propagation resistance, of Examples 1b and 2b are at a similarly high level in comparison with Comparative Examples 2 and 3. However, the results obtained for Example 1a are to be singled out in this respect. Although this is an unmilled silica, an acceptable tensile strength and an acceptable tear propagation resistance can already be achieved in comparison with a milled silica (Comparative Example 2). According to the prior art at present, this is not achievable with conventional unmilled precipitated silicas. However, the following advantages of the precipitated silicas according to the invention are to be singled cut in particular:

Example 1a, 1b, 2a and 2b show an extremely high translucency of the vulcanizates as a measure of the transparency and clarity of the crosslinked silicone systems. This permits use in novel silicon products which require extremely high transparencies. All Comparative Examples (1, 2 and 3) show substantially lower translucency values and the lightness of the vulcanizates, too, was determined with substantially lower values for Comparative Examples 1 and 2.

In the case of highly transparent vulcanizates, it is usually found that an increased b value is also a measure of the yellow component and an increased yellow discolouration. However, in spite of the highly transparent properties, all vulcanizates based on the precipitated silicas according to the invention show only moderate (Examples 1a, 1b) or very low (Examples 2a, 2b) b values and a very slight yellow discolouration (Examples 2a and 2 b).

In this respect, Examples 2a and 2b not only have a substantial improvement in comparison with conventional precipitated silicas (Comparative Example 1) but could also be substantially improved in direct comparison with the precipitated silicas already established in the market, which are offered for silicone rubber applications: Comparative Examples 2 and 3).

Comparative Examples 2 and 4, Examples 1a, 1b according to the invention show up to 20% faster incorporation times.

The Williams plasticity, a measure of the thickening and rheological properties of the compounds, is comparable for all examples shown in Table 4. A further advantage of the precipitated silicas according to the invention is found on consideration of the compound translucency.

In this respect, the comparison of Examples 1a, 1b, 2a and 2b with a conventional precipitated silica (Comparative Example 1) shows that the compound translucency as a measure of the compound transparency is at a high level. However, the very low b values, determined for all precipitated silicas according to the invention, are to be singled out in particular. A low b value is equivalent to very little yellow discolouration of the compound. If the b values of Examples 1a, 1b, 2a and 2b are now compared with Comparative Examples 2 to 4, it becomes clear that the compounds based on the precipitated silicas according to the invention have substantially less yellow discolouration. Unfortunately, the relatively small difference between the b values does not make this as clear as the simple visual assessment of the compounds (even by means of photographs, this difference

TABLE 4

Performance characteristics of different silicas in HTV silicone rubber - compounding by means of two-roll mill

|  | Example 1a | Example 1b | Example 2a | Example 2b | Comparative Example 1 | Comparative Example 2 | Comparative Example 3 | Comparative Example 4 |
|---|---|---|---|---|---|---|---|---|
| Compound properties | | | | | | | | |
| Incorporation time of the silica (min) | 20 | 22 | 25 | 25 | 28 | 25 | 20 | 25 |
| Williams plasticity | 180 | 191 | 204 | 207 | 213 | 198 | 199 | 180 |
| Compound translucency (%) | 70.8 | 68.6 | 68.5 | 70.7 | 55.5 | 73.6 | 76.2 | 76.8 |
| Compound lightness, l value (%) | 77.4 | 76.4 | 76.9 | 76.7 | 75.5 | 77.2 | 78.0 | 78 |
| Compound a value | 1.4 | 1.0 | 1.8 | 1.7 | 0.1 | 1.6 | 1.4 | 7.3 |
| Compound b value | 6.6 | 6.3 | 4.7 | 4.7 | 2.2 | 7.0 | 7.5 | 7.0 |
| Cured and postvulcanized HTV silicone rubber elastomer | | | | | | | | |
| Hardness (Shore A) | 51 | 51 | 53 | 54 | 52 | 60 | 53 | 49 |
| Tensile strength (N/mm$^2$) | 5.3 | 5.7 | 5.8 | 7.0 | 5.1 | 7.4 | 7.3 | 5.8 |
| Elongation at break (%) | 288 | 303 | 300 | 340 | 256 | 304 | 349 | 356 |
| Tear propagation resistance (N/mm) | 14.9 | 14.3 | 15.1 | 14.8 | 14.8 | 15.7 | 14.6 | 15.7 |
| Translucency | 85.5 | 85.6 | 80.9 | 83.8 | 75.3 | 84.1 | 87.3 | 86.5 |
| Lightness (l value) | 78.9 | 78.3 | 77.1 | 78.1 | 69.6 | 76.9 | 78.9 | 83.0 |
| a value | 0.4 | 0.5 | 0.1 | 0.2 | 2.0 | 0.2 | −0.2 | −0.4 |
| b value | 21.8 | 23.2 | 19.3 | 19.6 | 23.5 | 27.3 | 23.9 | 17.7 |
| Yellow discolouration | 43.4 | 46.5 | 30.6 | 31.0 | 43.5 | 44.3 | 37.6 | 25.4 |

Interpretation of the Test Results from Table 4

The precipitated silicas according to the invention (Examples 1a, 1b, 2a and 2b) have a reduced incorporation time in comparison with conventionally prepared precipitated silicas (Comparative Example 1). However, with the compounding method by means of the two-roll mill which is in any case substantially faster (in comparison with the kneader experiments—Table 3), in some cases substantial differentiation from precipitated silicas which are already available in the market and are offered especially for silicone rubber applications (Comparative Examples 2 to 4) is no longer possible. However, also in comparison with the precipitated silicas which are already available in the market and are offered especially for silicone rubber applications, from readily visible to the eye in daylight unfortunately cannot be shown in a reproducible manner).

The lower Shore A hardness of the precipitated silicas according to the invention (Examples 1a, 1b, 2a and 2b) in direct comparison with Comparative Example 2 is likewise advantageous since a lower vulcanizate hardness permits an increased silica addition (based on the formulation).

The mechanical properties, such as, for example, tensile strength and tear propagation resistance, of Example 2b are at a similarly high level in comparison with Comparative Examples 2 and 3. In this respect, however, the results obtained for Examples 1a and 2a are to be singled out in particular. Although these are unmilled silicas, tear propagation resistances which are just as high can be achieved in comparison with the milled precipitated silicas (Comparative Examples 2 and 3).

However, the following advantages of the precipitated silicas according to the invention are to be singled out in particular:

Examples 1a, 1b, 2a and 2b show a high translucency of the vulcanizates as a measure of the transparency and clarity of the crosslinked silicone systems in comparison with a conventional precipitated silica (Comparative Example 1). This permits use in highly transparent silicone products. In the case of highly transparent vulcanizates, an increased b value as a measure of the yellow component and an increased yellow discolouration are also usually found.

However, in spite of the highly transparent properties, all vulcanizates based on the precipitated silicas according to the invention show only moderate (Examples 1a, 1b) or very low (Examples 2a, 2b) b values and very little yellow discolouration (Examples 2a and 2 b).

In this respect, Examples 2a and 2b not only have a substantial improvement in comparison with conventional precipitated silicas (Comparative Example 1) but could also be substantially improved in direct comparison with the precipitated silicas already established in the market, which are offered for silicone rubber applications (Comparative Examples 2 and 3).

The invention claimed is:

1. A precipitated silica, having as physical properties:
a BET surface area of 185 to 260 m$^2$/g;
a CTAB surface area of 100 to 160 m$^2$/g;
a BET/CTAB ratio of 1.2 to 2.6;
a conductivity of from 1 to 250 (μS)/cm,
a median particle size $d_{50}$ of 8 to 25 μm, and
a tamped density of 50 to 140 g/l.

2. The precipitated silica of claim 1, having a median particle size $d_{50}$ of 10 to 20 μm.

3. The precipitated silica of claim 1, wherein a median particle size $d_5$ value is from 4 to 10 μm.

4. The precipitated silica of claim 1, wherein the conductivity is 1 to 200 (μS)/cm.

5. The precipitated silica of claim 1, having a DBP absorption of 250 to 300 g/100 g.

6. The precipitated silica of claim 1, having a moisture content of less than 7% by weight.

7. The precipitated silica of claim 1, having a pH of 5 to 8.

8. A process for preparing the precipitated silica according to claim 1, the process comprising:
a) preparing an initially introduced mixture having a Y value of 10 to 30;
b) simultaneously metering in at least one selected from the group consisting of an alkali metal silicate and an alkaline earth metal silicate, and an acidifying agent into the initially introduced mixture with stirring at 80 to 95° C. for 60 to 90 min, to obtain a precipitation suspension;
c) reacidifying the precipitation suspension, to obtain a reacidified suspension;
d) ageing the reacidified suspension for 5 to 50 min;
e) filtering, washing and drying,
wherein the at least one selected from the group consisting of the alkali metal silicate and the alkaline earth metal silicate employed in at least one selected from the group consisting of a) and b) has an alkali metal oxide or an alkaline earth metal oxide content in a range of 4 to 7% by weight and a silicon dioxide content in a range of 12 to 28% by weight, and
wherein the acidifying agent employed in at least one selected from the group consisting of b) and c) is at least one acidifying agent selected from the group consisting of a concentrated mineral acid, carbonic acid, $CO_2$ gas, sodium hydrogensulphite, and $SO_2$ gas, in any correspondingly possible concentration, and
wherein the Y value of the precipitation suspension is kept constant at a value between 10 and 30 during the precipitation, wherein kept constant means that the Y value varies by not more than 3% from a starting Y value, i.e. the value directly before beginning the simultaneously metering of the acidifying agent and the at least one selected from the group consisting of the alkali metal silicate and the alkaline earth metal silicate, during b).

9. The process of claim 8, wherein a demineralized water is employed in at least one of a) through e).

10. The process of claim 8, wherein a high shear force acts on the precipitated silica in one of a) through e).

11. The process of claim 8, wherein the drying is effected by spray drying.

12. A method of making a silicone rubber formulation, the method comprising:
combining a filler with a silicone rubber formulation wherein the filler comprises the precipitated silica of claim 1.

13. A silicone rubber formulation, comprising the precipitated silica of claim 1.

14. The precipitated silica of claim 1, having a moisture content of 5 to 7% by weight.

15. The precipitated silica of claim 1, having a moisture content of 5.5 to 7% by weight.

* * * * *